J. E. Corning,
Animal Trap.
No. 100,986. Patented Mar. 22. 1870.
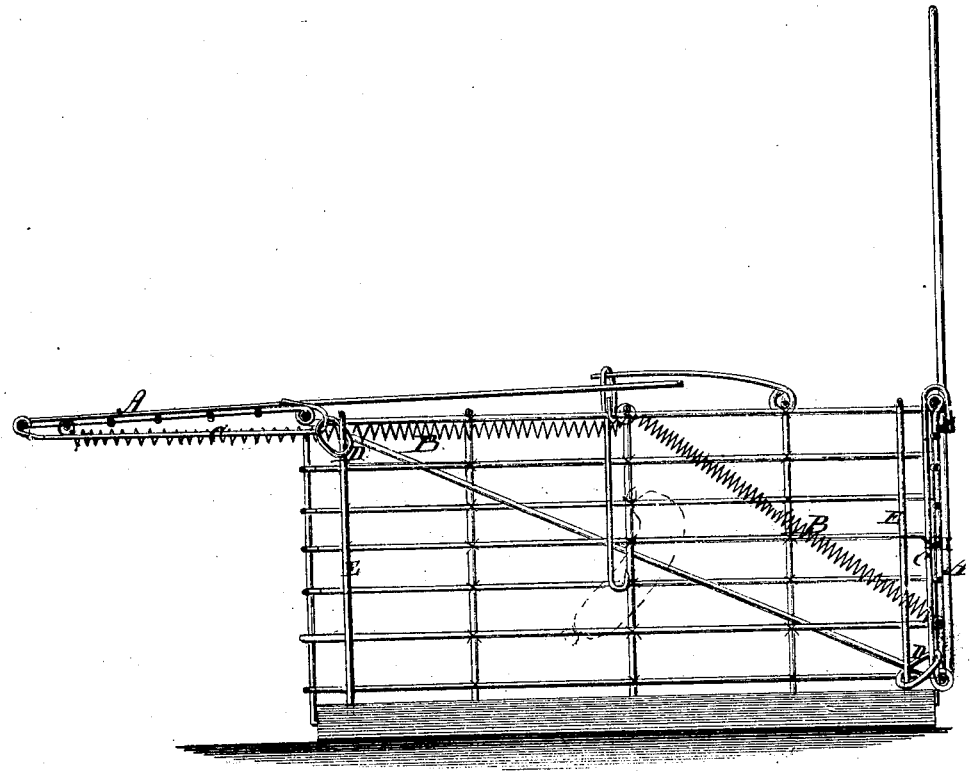
Witnesses:
Alex T. Roberts
Inventor:
J. E. Corning.
Per
Attorneys.

United States Patent Office.

JASPER E. CORNING, OF RYE, NEW YORK.

Letters Patent No. 100,986, dated March 22, 1870.

IMPROVED LOCKING DEVICE FOR TRAPS.

The Schedule referred to in these Letters Patent and making part of the same.

*To all whom it may concern:*

Be it known that I, JASPER E. CORNING, of Rye, in the county of Westchester and State of New York, have invented a new and useful Improvement in Locking Device for Traps; and I do hereby declare that the following is a full, clear, and exact description thereof, which will enable others skilled in the art to make and use the same, reference being had to the accompanying drawing forming part of this specification.

This invention relates to improvements in devices for locking the doors of wire and other animal traps, having doors swinging in vertical planes, and consists in the application to rods on the door which assume vertical or nearly vertical positions when the door is closed, and to fixed vertical rods arranged to be parallel or nearly so with the said rods on the door, when the latter is closed, of locking-rings which will drop to the bottom, and hold the door against swinging open until the rings are raised, which may be done most readily by turning the trap bottom side up, and allowing them to fall to the top of the trap, where they are retained by the aforesaid rods attached to the doors, after the latter are opened.

The drawing represents a longitudinal sectional elevation of a trap, with my improved locking device affixed to it, one end showing the door in the closed and locked position, and the other the open position.

A represents the doors of a common wire or other trap, arranged to swing in vertical planes for closing and opening, and having strong wire springs B, for closing them quickly, when the apparatus for closing them is tripped.

C is a rod of wire attached to the upper and lower horizontal bars of the door, or otherwise suitably fastened so as to allow of unobstructed passage between the ends so connected of a ring or link, D.

E is another rod permanently attached to the trap at top and bottom, and in such position as to be near to and parallel with the rod C, when the door is closed. The ring D is placed on these rods C E so as to slide up and down on them freely, for holding the doors shut when closed, and the said rings are at the bottom, to which they fall as soon as the doors close.

The said rings are moved to the top when the doors are to be opened, and are held thereat by the rods C, as clearly shown in the drawing, while the said rods are in the horizontal position.

For moving the rings to the top of the trap for opening it, in the case of small, light traps, they may be turned bottom up, and the doors opened at the same time; and for larger traps they may be raised by lines with hooks dropped down from the top, or by other equivalent means.

Each door may be provided with one or more of these locking devices, as preferred. I prefer to apply two sets to each door, placing one near each end.

Having thus described my invention,

I claim as new and desire to secure by Letters Patent—

The combination with the rods C, attached to the doors, of the fixed rods E and the rings D, arranged for operation substantially as specified.

JASPER E. CORNING.

Witnesses:
GEO. W. MABEE,
ALEX. F. ROBERTS.